(12) United States Patent
Seol et al.

(10) Patent No.: US 11,527,188 B2
(45) Date of Patent: Dec. 13, 2022

(54) DISPLAY DEVICE INCLUDING A DRIVING MEMBER TO PULL UP A DISPLAY PANEL WITHIN A HOUSING

(71) Applicant: LG Display Co., Ltd., Seoul (KR)

(72) Inventors: SeungWon Seol, Gyeonggi-do (KR); JongYoung Park, Gyeonggi-do (KR); Hyojin Jung, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/539,920

(22) Filed: Dec. 1, 2021

(65) Prior Publication Data
US 2022/0180786 A1 Jun. 9, 2022

(30) Foreign Application Priority Data
Dec. 9, 2020 (KR) .................. 10-2020-0171610

(51) Int. Cl.
*G09G 3/20* (2006.01)
*G06F 1/3206* (2019.01)
*G06F 1/3234* (2019.01)

(52) U.S. Cl.
CPC ............ *G09G 3/20* (2013.01); *G06F 1/3206* (2013.01); *G06F 1/3265* (2013.01)

(58) Field of Classification Search
None
See application file for complete search history.

(56) References Cited

U.S. PATENT DOCUMENTS

| 3,761,152 A * | 9/1973 | Cory ..................... A47B 51/00 312/7.2 |
| 5,797,666 A * | 8/1998 | Park ................... A47B 21/0073 312/223.3 |
| 7,806,490 B1 * | 10/2010 | Buehl .................. A47B 81/064 312/319.5 |
| 2004/0090154 A1 * | 5/2004 | Chang ................ A47B 21/0073 348/E5.128 |

FOREIGN PATENT DOCUMENTS

| CN | 1514444 A | 7/2004 |
| CN | 109099271 A | 12/2018 |
| CN | 208861603 U | * 5/2019 |
| CN | 110419865 A | 11/2019 |
| CN | 209688413 U | 11/2019 |
| CN | 210896330 U | 6/2020 |
| EP | 3 367 675 A2 | 8/2018 |
| JP | 2008-533503 A | 8/2008 |
| JP | 2020-8856 A | 1/2020 |
| JP | 2020-87431 A | 6/2020 |
| KR | 10-2006-0124409 A | 12/2006 |
| KR | 10-2007-0005964 A | 1/2007 |
| KR | 20-2011-0000277 U | 1/2011 |

(Continued)

*Primary Examiner* — Kirk W Hermann
(74) *Attorney, Agent, or Firm* — Birch, Stewart, Kolasch & Birch, LLP

(57) ABSTRACT

A display device may include a module housing accommodating a display panel pulled up and down, a moving plate accommodated in the module housing and pulled up and down with the display panel, a driving member pulling up and down the moving plate and the display panel, and a fixed plate coupled to an inside of the module housing and to which the driving member is fixed.

13 Claims, 11 Drawing Sheets

(56) References Cited

FOREIGN PATENT DOCUMENTS

| | | |
|---|---|---|
| KR | 10-2011-0087357 A | 8/2011 |
| KR | 10-1573057 B1 | 11/2015 |
| KR | 10-1600925 B1 | 3/2016 |
| KR | 10-2019-0092980 A | 8/2019 |
| KR | 10-2020-0054062 A | 5/2020 |
| KR | 10-2020-0085531 A | 7/2020 |
| WO | WO 2014/114698 A1 | 7/2014 |
| WO | WO-2014114698 A1 * | 7/2014 ......... A47B 21/0073 |

* cited by examiner

DISPLAY DEVICE INCLUDING A DRIVING MEMBER TO PULL UP A DISPLAY PANEL WITHIN A HOUSING

CROSS REFERENCE TO RELATED APPLICATION

This application claims priority to Korean Patent Application No. 10-2020-0171610, filed in the Republic of Korea on Dec. 9, 2020, the entire contents of which are hereby expressly incorporated by reference for all purposes as if fully set forth herein into the present application.

BACKGROUND

Field

Embodiments of the present disclosure relate to a display device.

Description of Related Art

In general, liquid crystal display (LCD) devices, plasma display devices, field emission display devices, and light emitting display devices are under active research as flat display devices. Among them, the LCD devices and the light emitting display devices have attracted attention in view of their benefits of mass production, ease of driving means, and high image quality.

However, such a display device has gradually increased in volume to meet the needs of users for a larger screen, thereby increasing a risk of damage to the display panel and requiring a larger space for installation which can make users difficult to secure the space.

In addition, in order to provide an always-on-display mode that continuously displays various information desired by the users, an always-on-display device is needed in addition to a general display device in a normal mode, which can make it difficult to satisfy various users demand.

Therefore, to address the aforementioned issues and provide a display device which appeals more diverse use to users, there is a need for research on providing a display device engaged to furniture, equipment, facilities, etc., to implement various forms of display.

BRIEF SUMMARY OF THE DISCLOSURE

Embodiments of the present disclosure provide a display device allowing a user to freely accommodate a display panel in a housing so as not to be externally exposed, or to change the display device between an always-on-display mode and a normal mode depending on the user's need.

Embodiments of the present disclosure also provide a display device configured to be mounted without being constrained by an additional mounting space, thereby using a space efficiently, and to reduce a risk of damage due to an external impact by minimizing the external exposure of the display panel, thereby satisfying various user demands.

The objectives of the embodiments of the present disclosure are not limited to what has been described above, and other unmentioned objectives will be clearly understood to those skilled in the art from the following description.

According to an aspect, embodiments of the present disclosure provide a display device including a module housing accommodating a display panel pulled up and down, a moving plate accommodated in the module housing and pulled up and down with the display panel, a driving member pulling up and down the moving plate and the display panel, a fixed plate coupled to the inside of the module housing and to which the driving member is fixed.

According to embodiments of the present disclosure, there can be provided a display device allowing a user to freely accommodate a display panel in a housing so as not to be externally exposed, or to change the display device between an always-on-display mode and a normal mode depending on the user's need.

According to embodiments of the present disclosure, there can be provided a display device configured to be mounted without being constrained by an additional mounting space, thereby using a space efficiently, and to reduce a risk of damage due to an external impact by minimizing the external exposure of the display panel, thereby satisfying various user demands.

DETAILED DESCRIPTION OF THE EMBODIMENTS

Figure 1:
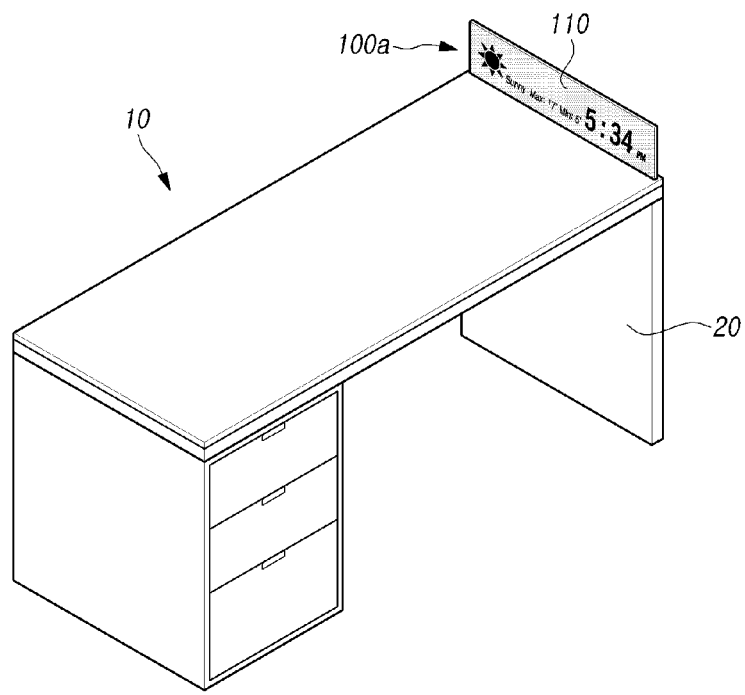
FIGS. 1 and 2 are schematic views illustrating a display device according to embodiments of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another.

Further, in the following description of examples or embodiments of the present invention, detailed descriptions of well-known functions and components incorporated herein will be omitted when it is determined that the description can make the subject matter in some embodiments of the present invention rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" can be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can".

Figure 2:
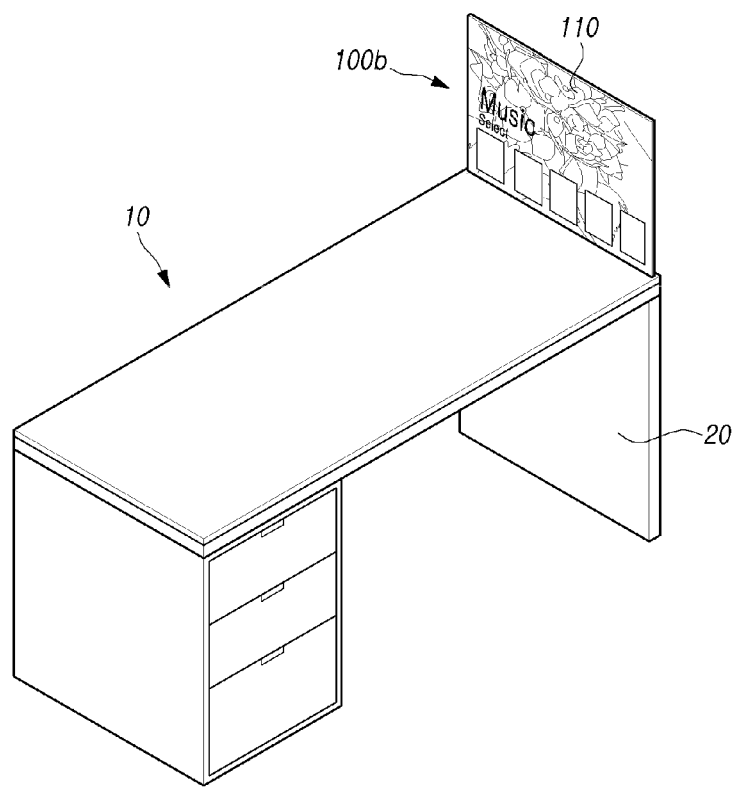
Figure 6:
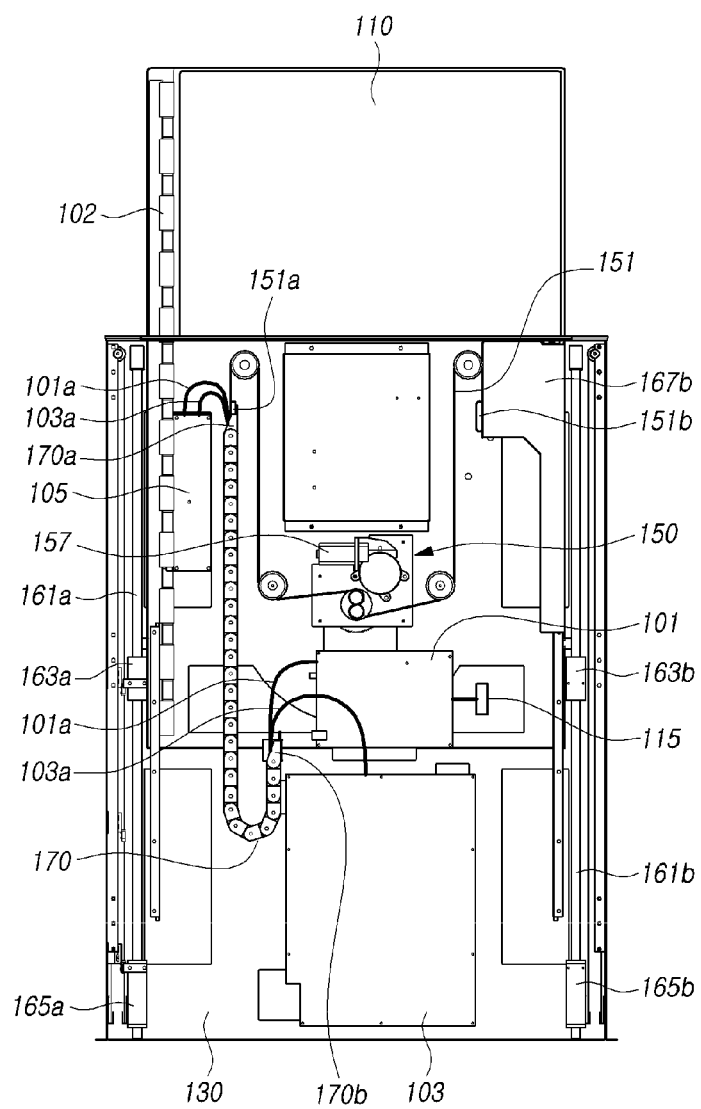
FIG. 6 is a front view illustrating a display device according to embodiments of the present disclosure.
Figure 7:
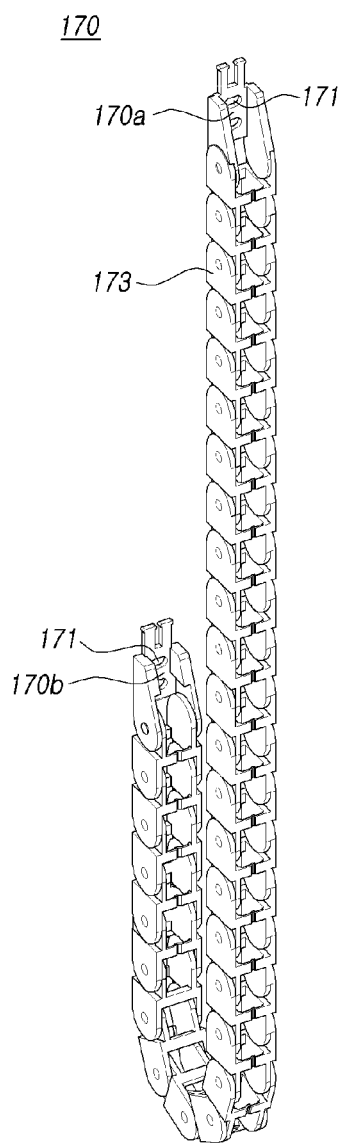
FIGS. 7 to 9 are perspective views illustrating a display device according to embodiments of the present disclosure.
Figure 8:
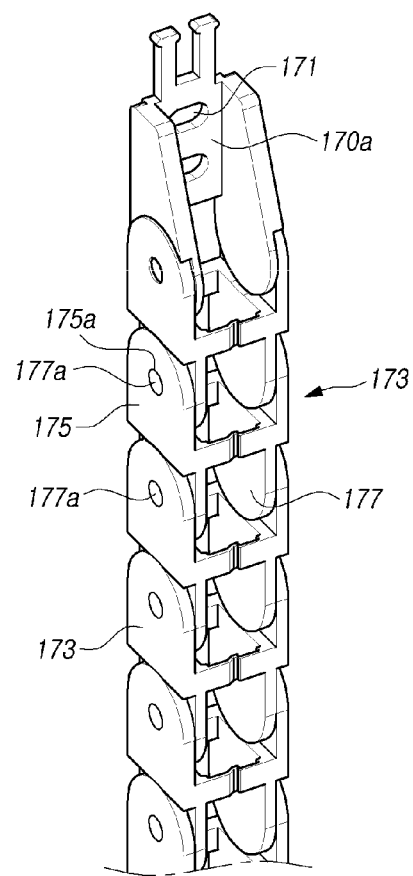
Figure 9:
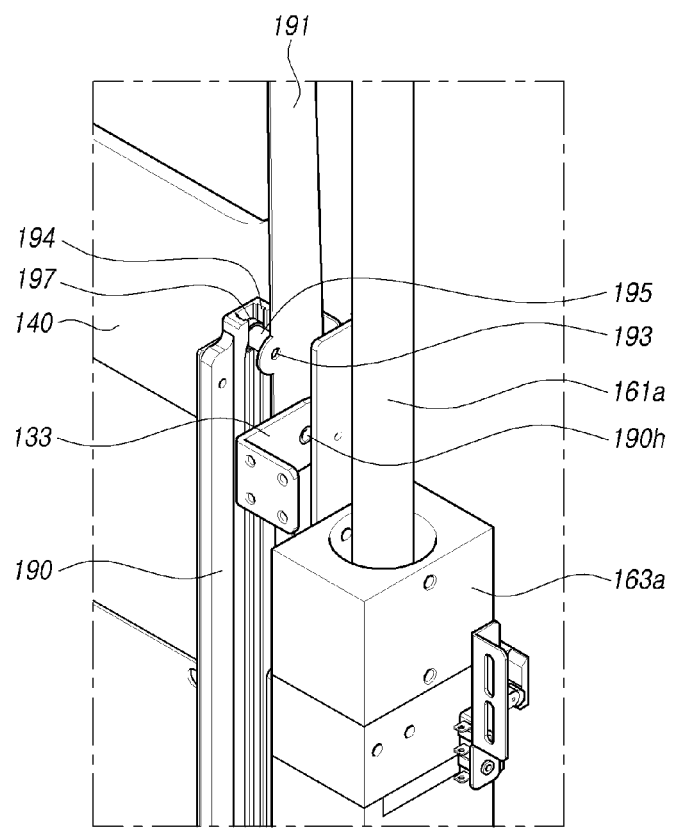
Figure 10:
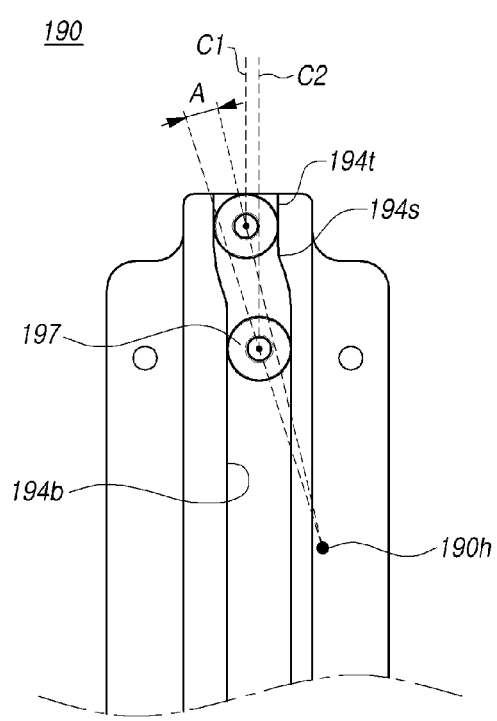
FIG. 10 is an explanatory view illustrating an operating state of a display panel according to embodiments of the present disclosure.

FIGS. 1 and 2 are schematic views illustrating a display device according to embodiments of the present disclosure. FIGS. to 5 are perspective views illustrating a display device according to embodiments of the present disclosure. FIG. 6 is a front view illustrating a display device according to embodiments of the present disclosure. FIGS. 7 to 9 are perspective views illustrating a display device according to embodiments of the present disclosure. FIG. 10 is an explanatory view illustrating an operating state of a display panel according to embodiments of the present disclosure. FIG. is a perspective view illustrating a display device according to embodiments of the present disclosure. All the components of each display device according to all embodiments of the present disclosure are operatively coupled and configured.

Referring to FIGS. 1 to 11, a display device according to one or more embodiment of the present disclosure can include a module housing 120 accommodating a display panel 110 which can be pulled up and down, a moving plate 140 accommodated in the module housing 120 and being pulled up and down with the display panel 110, a driving member 150 for pulling up and down the moving plate 140 by winding or releasing a driving belt 151, a fixed plate 130 coupled to the inside of the module housing 120 and to which the driving member 150 is fixed. The moving plate 140 has a front surface coupled to the display panel 110 and a rear surface provided with moving brackets 167a, 167b to which the driving belt 151 coupled.

The module housing 120 is built in and fixed inside of a main housing 10. The main housing 10 can be common furniture, equipment, facilities, etc.

Hereinafter, a display device according to embodiments of the present disclosure is given, wherein the module housing 120 is built in inside of a bottom support portion 20, corresponding to a leg of a table that is the most common furniture. The display panel 110 displays, while the display panel 110 is pulled up to the upper portion of the table or is pulled down from the upper portion of the table.

In addition, a display device according to embodiments of the present disclosure can provide either of (a) an always-on-display mode (AOD mode) that continuously displays information such as a clock, weather or news, and (b) a normal mode that displays an image or video desired by a user.

As illustrated in FIG. 1, in usual time, most of the display panel 110 is covered inside the module housing 120 as only a portion of the display panel 110 is pulled up, whereby the always-on-display mode 100a can be provided.

FIG. 1 is illustrated, wherein the module housing 120 is installed by forming an empty space inside of the bottom support portion 20 of the main housing 10 when the always-on-display mode 100a is being provided.

FIG. 2 is illustrated, wherein the normal mode 100b is being provided, which holds the display screen to the full size as the display panel 110 is pulled up.

As an example, the module housing 120 has a rectangular shape in which the display panel 110, the moving plate 140, the driving member 150 and the fixed plate 130 are accommodated, but is not limited thereto. The module housing 120 can be partially omitted in the drawings for convenience of description.

The display panel 110, the moving plate 140, and the fixed plate 130 to which the driving member 150 is coupled are accommodated in the module housing 120 and sequentially stacked from the front side to the rear side of the module housing 120.

The display panel 110 is coupled to the front surface of the moving plate 140 and can be pulled up and down with the moving plate 140. According to embodiments of the present disclosure, the display panel 110 can be either an LCD panel or a light emitting display panel such as an organic light emitting display (OLED) panel.

For example, when the display panel is an LCD panel, the display panel can further include a backlight unit irradiating light onto the LCD panel, a lower polarization plate attached to a lower substrate, and an upper polarization plate attached to the front surface of an upper substrate. The specific configurations of the lower substrate and the upper substrate can vary according to driving modes of the LCD panel, for example, twisted nematic (TN) mode, vertical alignment (VA) mode, in plane switching (IPS) mode, and fringe field switching (FFS) mode.

Further, when the display panel is a light emitting display panel, the light emitting display panel can include a lower substrate with a plurality of light emitting cells formed in the areas each of which is defined by gate lines, data lines, and power (VDD) lines, and an upper substrate bonded to the lower substrate face to face. Drawings and a detailed description of the light emitting display panel are not provided herein.

As described above, the display panel is not limited to any particular type in embodiments of the present disclosure. For example, the display panel can be made up of a flexible substrate to be bendable in embodiments of the present disclosure. The following description is given irrespective of display panel types.

The display panel 110 is coupled to the front surface of the moving plate 140, and the moving brackets 167a, 167b which is coupled to the driving belt 151 are provided in the rear surface of the moving plate 140. The moving plate 140 moves along guide bars 161a, 161b, to be described later, with the display panel 110 when the driving belt 151 is being wound or released by the moving member 150.

In addition, the moving bracket 167a, 167b are provided with a through hole 108, a flexible circuit film 106 connected to a source printed circuit board 102 of the display panel 110 is penetrated by the through hole 108. Thus, the display panel 110 and the moving plate 140 can be stably pulled up and down while the flexible circuit film 106 is connected to the control printed circuit board 105.

The moving brackets 167a, 167b are fixed to the opposite side of the moving plate 140. The moving brackets 167a, 167b are fixed to one end 151a and other end 151b of the driving belt 151, respectively, and pulled up and down with the moving plate 140.

The control printed circuit board 105 connected to the flexible circuit film 106 which is bent and passes through the through hole 108 is fixed to the rear surface of the one of the moving brackets 167a, 167b, for example, the moving bracket 167a. Thus, the control printed circuit board 105 connected to a main board 101 and a power board, to be described later, can be stably fixed when the moving plate 140 and the display panel 110 are pulled up and down.

A main board 101, on which one or more image processors electrically connected to the control printed circuit board 105 and supplying a data signal and a control signal is mounted, and a power board 103, which supplies power to the display panel 110, are fixed to the fixed plate 130, which is disposed at the rear to the moving plate 140.

In addition, a position sensor 115 coupled to the fixed plate 130 senses and transmits the position of the display panel 110 to the main board 101. The main board 101 controls the display panel 110 to either of the always-on-display mode and the normal mode according to the position of the display panel 110.

The position of the display panel 110 which determines the display panel 110 to the always-on-display mode can be set in advance. As illustrated in FIG. 1, embodiments of the present disclosure can be provided with the main board 101 for controlling the display panel 110 in the always-on-display mode when the display panel 110 is pulled up to the preset position of the upper portion of the table, by the way of example.

A cable penetrating member 170 protecting a data cable 101a, which connects the main board 101 and the control printed circuit board 105, and a power cable 103a, which connects the power board 103 and the control printed circuit board 105, are provided.

The cable penetrating member 170 (e.g., see FIGS. 7 and 8) includes one end 170b coupled to the fixed plate 130 and another end 170a coupled to the moving bracket 167a of the moving plate 140. Thus, the other end 170a of the cable penetrating member 170 is pulled up and down with the moving plate 140.

The cable penetrating member 170 includes a plurality of connecting members 173 rotatably connected to each other. Each of the connecting members 173 has an empty space formed therein so that the cables 101a, 103a can penetrate from the one end 170b to the other end 170a of the cable penetrating member 170. Thus, the cable penetrating member 170 can maintain a "U" shape, the lengths of both sides of which change when the moving plate 140 is being pulled up and down, thereby preventing the cables 101a, 103a from interference with surrounding electronic components while being pulled up and down.

Each of the connecting members 173 has a couple of first connecting portions 175 disposed opposite to each other and a couple of second connecting portions 177 disposed opposite to each other. The first connecting portions 175 are extended in one direction from a center portion provided with the empty space through which the cables 101a, 103a pass. The second connecting portions 177 are extended in the opposite direction from the center portion.

The first connecting portions 175 are provided with connecting holes 175a and are overlapped with the second connecting portions 177 of the nearby connecting member 173. The first connecting portion 175 and the second connecting portion 177 adjacent to each other are coupled as a rotation protrusion 177a is inserted to the connecting hole 175a.

The connecting member 173 disposed at the one end 170b and the other end 170a of the cable penetrating member 170 are provided with a coupling hole 171 so as to be coupled to the fixed plate 130 and the moving bracket 167a by a coupling member.

The driving member 150 pulling up and down the moving plate 140 includes, a driving motor 157 coupled to the fixed plate 130, a driving gear 156 and a driven gear 154 rotated by the driving motor 157, a driving pulley 153 coupled coaxially to the driven gear 154 to wind or release the driving belt 151, and driven pulleys 155a, 155b connected to the driving pulley 153 by the driving belt 151 and coupled to the fixed plate 130.

The driving motor 157 rotates the driving pulley 153 with the number of revolutions reduced by the constant gear ratio between the driving gear 156 and the driven gear 154. The opposite ends of the driving belt 151 are coupled to the driving pulley 153 to be wound in the same direction.

Therefore, the moving plate 140 and the display panel 110 are pulled up when the driving belt 151 is wound as the driving pulley 153 rotates in one direction, and the moving plate 140 and the display panel 110 are pulled down when the driving belt 151 is released as the driving pulley 153 rotates in opposite direction.

Figure 3:
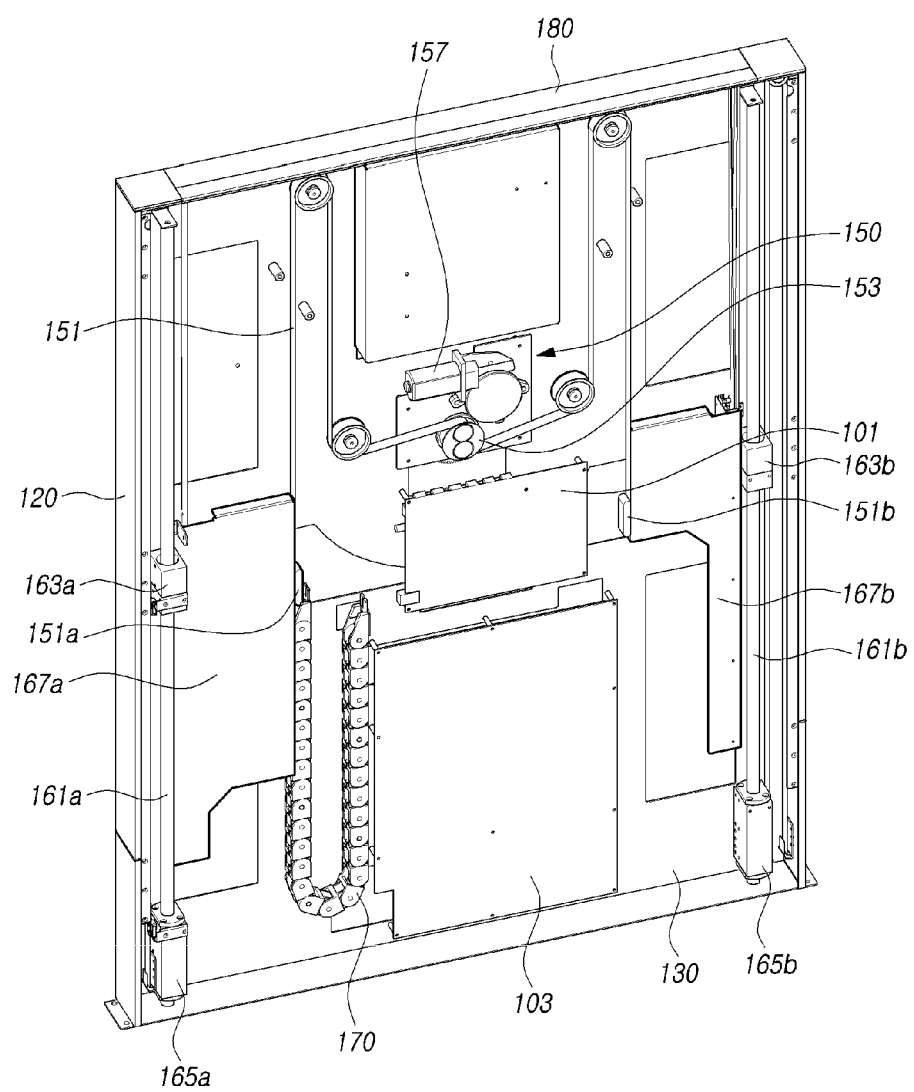
FIGS. 3 to 5 are perspective views illustrating a display device according to embodiments of the present disclosure.
Figure 4:
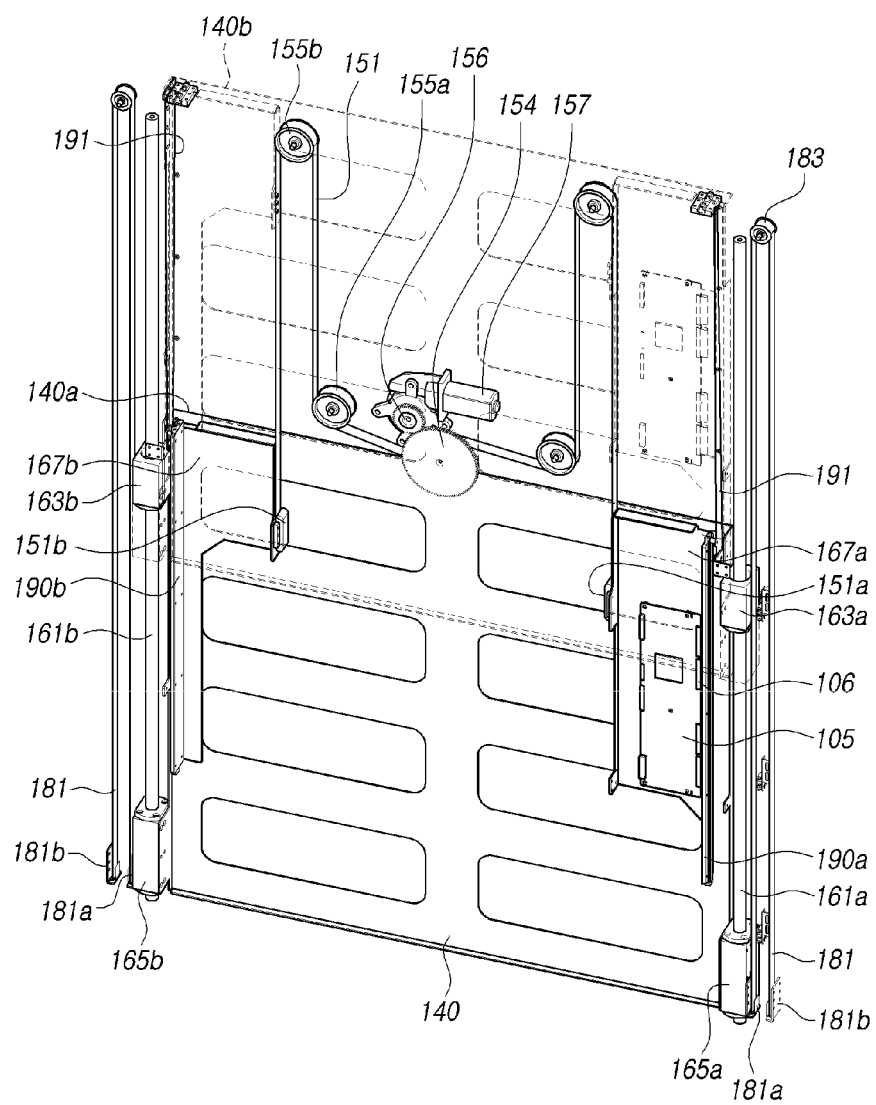
Figure 5:
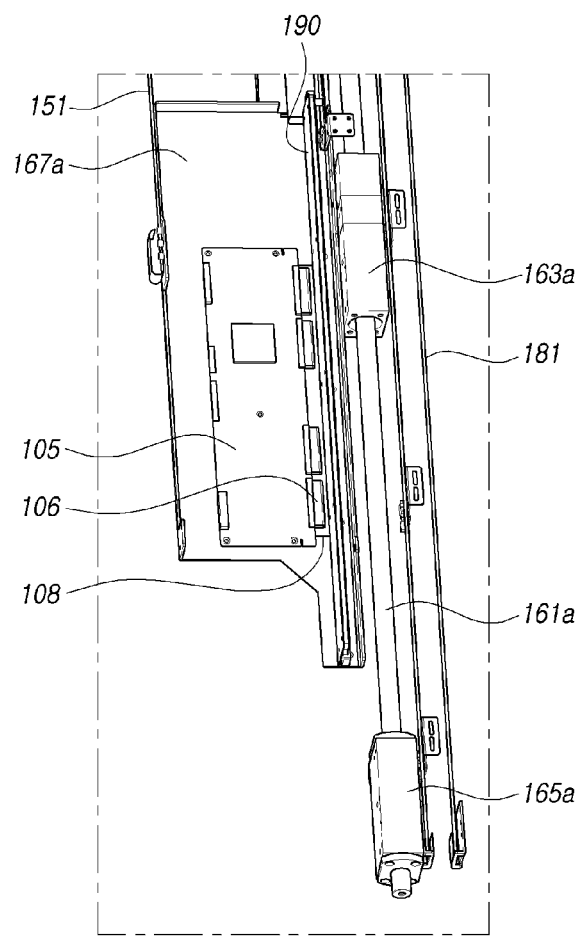

For example, when the driving pulley 153 rotates in a clockwise direction in FIG. 3 which illustrates the front direction of the fixed plate 130 or when the driving pulley 153 rotates in a counterclockwise direction in FIG. 4 which illustrates the rear direction of the moving plate 140, the moving plate 140 and the display panel 110 are pulled up.

In addition, the driving member 150 can further include guide bars 161a, 161b each including opposite ends fixed to the module housing 120, and moving guides 165a, 165b coupled to one side of the moving plate 140 and pulled up and down along the guide bars 161a, 161b.

The moving guide 165a, 165b coupled to the moving plate 140 are pulled up and down along the guide bars 161a, 161b. Thus, the moving plate 140 is stably pulled up and down without being biased to either side while the driving force of the driving motor 157 pulls up and down the moving plate 140 via the driving belt 151.

The guide bars 161a, 161b and the moving guides 165a, 165b are disposed at the opposite sides of the module housing 120 and guide the moving plate 140 to be pulled up and down. Stoppers 163a, 163b are provided nearby the middle of the guide bars 161a, 161b, respectively, to limit the height of the moving guides 165a, 165.

FIG. 4 illustrates the moving plate 140 is being pulled up from a pulled down position 140a to a pulled up position 140b. FIG. 6 illustrates the display panel 110 at the pulled up position 140b.

In addition, the driving member 150 can further include elastic belts 181 having one end 181a coupled to the moving guide 165a, 165b and another end 181b fixed to the module housing 120, and belt rollers 183 fixed to the fixed plate 130. The elastic belts 181 are wound on the belt rollers 183 and rotatably supported by the belt rollers 183.

The elastic belts 181 are configured to provide a tensile force to the moving plate 140 at the pulled down position. Thus, the driving force of the driving motor 157 is assisted by the tensile force of the elastic belts 181 when the moving plate is being pulled up.

Therefore, a force to pull up the moving plate 140 is reduced when the moving plate 140 is being pulled up, and the moving plate 140 is maintained horizontally while being pulled up and down.

Meanwhile, a sliding door 180 which is closed when the display panel 110 is drawn in and is opened when the display panel 110 is drawn out by being slid in the front and rear directions of the module housing 120 to pull up the display panel 110 is provided at the upper portion of the module housing 120. Thus, the display panel 110 may not be exposed outside or can be in the always-on-display mode illustrated in FIG. 1.

The sliding door 180 is opened by being slid in the front and rear directions of the module housing 120. Door levers 191 each includes one end coupled to the sliding door 180 and other end rotatably coupled to the fixed plate 130 are provided.

Each of the door levers 191 is rotatably coupled to a hinge bracket 133 coupled to the fixed plate 130 via a hinge axis 190h, and is supported by a sliding rail 190 coupled to the moving plate 140 by a rotation supporting member 197 provided at a support hole 193 of the door lever 191 spaced apart from the hinge axis 190h. Wherein, the sliding rail 190 at two sides of the moving plate 140 are the sliding rail 190a and the sliding rail 190b respectively.

The rotation supporting member 197 can be a roller or a bearing. The rotation supporting shaft 195 is rotatably coupled to the support hole 193.

As illustrated in FIG. 9, a guide groove 194 into which the rotation supporting member 197 is inserted is provided inside of the sliding rail 190. As illustrated in FIG. 10, the guide groove 194 includes a top guide groove 194t and a bottom guide groove 194b having parallel center lines C1, C2 and connected via a curved groove 194s.

The center line C1 of the top guide groove 194t and the center line C2 of the bottom guide groove 194b are disposed parallel with a constant distance. The rotation supporting member 197 inserted into the guide groove 194 is provided at the opposite sides of the top guide groove 194t or the opposite sides of the bottom guide groove 194b.

Therefore, the rotation supporting member 197 moves along the top guide groove 194t, the curved groove 194s, and the bottom guide groove 194b when the sliding rail 190 is pulled up and down with the moving plate 140. The door lever 191 is rotated with a predetermined angle A about the hinge shaft 190h as the rotation support member 197 moves, so that the sliding door 180 is opened or closed.

Figure 11:
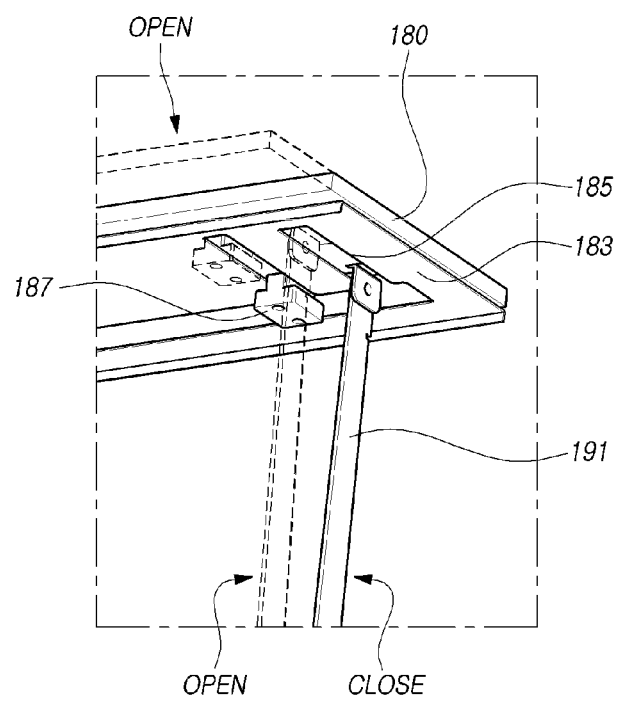
FIG. 11 is a perspective view illustrating a display device according to embodiments of the present disclosure.

As illustrated in FIG. 11, a door plate 183 provided with a moving hole 185 configured to enable the door lever 191 to move is coupled to the module housing 120 beneath the sliding door 180. A door guide 187 guiding the sliding door 180 is coupled to the sliding door 180 and moves along a coupling hole of the door plate 183.

Therefore, the display panel 110 is protected from an external impact and occupies minimized space as the sliding door 180 closed the upper portion of the module housing 120 when accommodating the display panel 110 into the main housing 10 so as not to be exposed outside.

As described above, according to embodiments of the present disclosure, there can be provided a display device allowing a user to freely accommodate a display panel in a housing so as not to be externally exposed, or to change the display device between an always-on-display mode and a normal mode when the user needs.

Further, according to embodiments of the present disclosure, there can be provided a display device configured to be mounted without being constrained by an additional mounting space, thereby using a space efficiently, and to reduce a risk of damage due to an external impact by minimizing the external exposure of the display panel, thereby satisfying various user demands.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention.

The above description and the accompanying drawings provide an example of the technical idea of the present invention for illustrative purposes only. For example, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:
 a module housing configured to accommodate a display panel pulled up and down;
 a moving plate accommodated in the module housing and pulled up and down with the display panel, the moving plate including a front surface coupled to the display panel and a rear surface provided with moving brackets to which a driving belt is coupled;
 a driving member configured to pull up and down the moving plate by winding or releasing the driving belt; and
 a fixed plate coupled to an inside of the module housing and to which the driving member is fixed,
 wherein one of the moving brackets is provided with a through hole penetrated by a flexible circuit film connected to a source printed circuit board of the display panel.

2. The display device according to claim 1, further comprising:
 a control printed circuit board to which the flexible circuit film penetrating the through hole is bent and connected,
 wherein the control printed circuit board is fixed to the moving brackets.

3. The display device according to claim 2, further comprising:
 a main board and a power board fixed to the fixed plate,
 wherein the power board supplies power to the display panel.

4. The display device according to claim 3, further comprising:
 a position sensor coupled to the fixed plate and configured to sense and transmit a position of the display panel to the main board,
 wherein the main board controls the display panel as an always-on-display mode when an end portion of the display panel is overlapped with a preset position.

5. The display device according to claim 3, wherein the display device further comprises:

a cable penetrating member including one end coupled to the fixed plate and another end coupled to the moving plate;
a data cable connecting the main board and the control printed circuit board; and
a power cable connecting the power board and the control printed circuit board to penetrate an inside of the cable penetrating member.

6. The display device according to claim 5, wherein the cable penetrating member includes a plurality of connecting members rotatably connected to each other,
each of the connecting members has a couple of first connecting portions disposed opposite to each other and a couple of second connecting portions disposed opposite to each other,
the first connecting portions are extended in one direction from a center portion provided with an empty space through which the data cable and the power cable pass, and
the second connecting portions are extended in a direction opposite to the one direction from the center portion.

7. The display device according to claim 6, wherein the first connecting portions are provided with connecting holes,
the second connecting portions are provided with rotation protrusions, and
the first connecting portions and the second connecting portions overlapped with the first connecting portions are coupled when the rotation protrusions are inserted to the connecting holes.

8. The display device according to claim 6, wherein the connecting members disposed at one end and another end of the cable penetrating member are provided with coupling holes.

9. The display device according to claim 1, wherein the module housing is built in and fixed inside of a main housing, and
the display panel is pulled up to an upper portion of the main housing or pulled down from the upper portion of the main housing.

10. The display device according to claim 1, wherein the display panel, the moving plate and the fixed plate are sequentially stacked from a front side to a rear side of the module housing.

11. A display device comprising:
a module housing configured to accommodate a display panel pulled up and down;
a moving plate accommodated in the module housing and pulled up and down with the display panel, the moving plate including a front surface coupled to the display panel and a rear surface provided with moving brackets to which a driving belt is coupled;
a driving member configured to pull up and down the moving plate by winding or releasing the driving belt; and
a fixed plate coupled to an inside of the module housing and to which the driving member is fixed,
wherein the driving member comprises:
a driving motor coupled to the fixed plate;
a driving gear and a driven gear rotated by the driving motor;
a driving pulley coupled coaxially to the driven gear to wind or release the driving belt;
driven pulleys connected to the driving pulley by the driving belt and coupled to the fixed plate;
guide bars each including opposite ends fixed to the module housing; and
moving guides coupled to one side of the moving plate and pulled up and down along the guide bars, respectively,
wherein the driving member includes elastic belts having one end coupled to the moving guides and another end fixed to the module housing, and
belt rollers fixed to the fixed plate and the elastic belts are wound on the belt rollers and rotatably supported by the belt rollers.

12. A display device comprising:
a module housing configured to accommodate a display panel pulled up and down;
a moving plate accommodated in the module housing and pulled up and down with the display panel, the moving plate including a front surface coupled to the display panel and a rear surface provided with moving brackets to which a driving belt is coupled;
a driving member configured to pull up and down the moving plate by winding or releasing the driving belt; and
a fixed plate coupled to an inside of the module housing and to which the driving member is fixed,
wherein a sliding door which is closed when the display panel is drawn in and is opened when the display panel is drawn out by being slid in front and rear directions of the module housing, is provided at an upper portion of the module housing,
wherein the display device further comprises:
door levers each including one end coupled to the sliding door and another end rotatably coupled to the fixed plate, and
wherein each of the door levers is rotatably coupled to a hinge bracket coupled to the fixed plate with a hinge axis, and is supported by a sliding rail coupled to the moving plate by a rotation supporting member provided at a support hole of the each door lever spaced apart from the hinge axis.

13. The display device according to claim 12, wherein a guide groove into which the rotation supporting member is inserted is provided inside of the sliding rail, and
the guide groove includes a top guide groove and a bottom guide groove having parallel center lines and connected via a curved groove.

* * * * *